March 16, 1926.
F. H. GERBIG ET AL
1,577,222
POULTRY FEEDER
Filed June 9, 1924    2 Sheets-Sheet 1
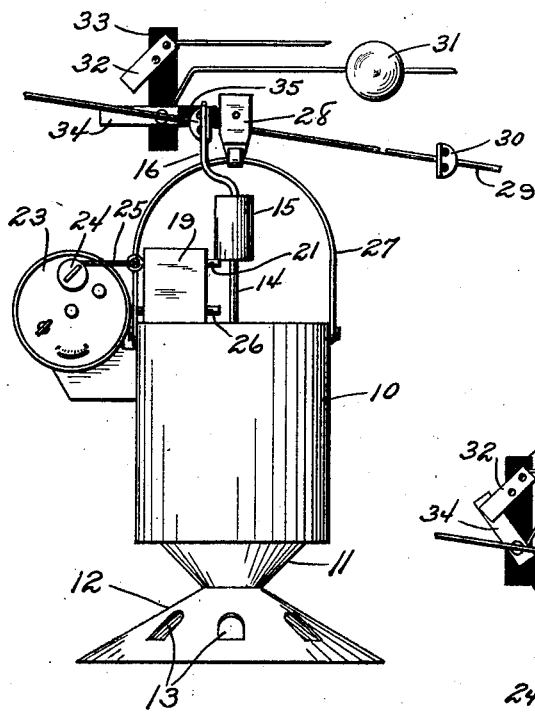
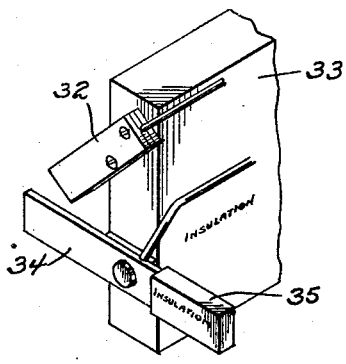
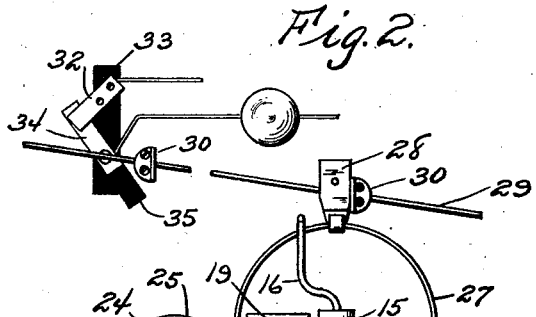
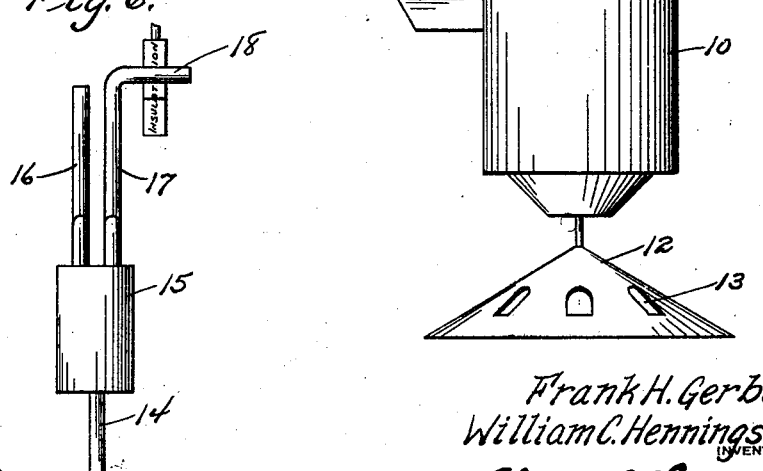
Frank H. Gerbig
William C. Henningsen
INVENTOR
BY Victor J. Evans
ATTORNEY March 16, 1926.

F. H. GERBIG ET AL

POULTRY FEEDER

Filed June 9, 1924

Frank H. Gerbig
William C. Henningsen
INVENTORS

BY Victor J. Evans
ATTORNEY

WITNESS

Patented Mar. 16, 1926.

1,577,222

UNITED STATES PATENT OFFICE.

FRANK H. GERBIG AND WILLIAM C. HENNINGSEN, OF WATERTOWN, WISCONSIN.

POULTRY FEEDER.

Application filed June 9, 1924. Serial No. 718,903.

*To all whom it may concern:*

Be it known that we, FRANK H. GERBIG and WILLIAM C. HENNINGSEN, citizens of the United States, residing at Watertown, in the county of Jefferson and State of Wisconsin, have invented new and useful Improvements in Poultry Feeders, of which the following is a specification.

This invention relates to poultry feeders, and contemplates a structure automatically operable and time controlled so that the poultry can be fed at any predetermined time in the day or night, so that the farmer or owner need not leave the field, or get up in early hours of the morning for this purpose.

In carrying out the invention we also provide means for automatically turning on lights at the time the feeder is put in operation, so that the poultry can leave their roost for the purpose of feeding.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a view in elevation of the poultry feeder arranged in a set position.

Figure 2 is a view showing the feeder in elevation but in an operative position.

Figure 5 is a detail view of the switch included in the circuit with the electric lamp.

Figure 6 is a detail view of the combined bottom and spreader support for the feeder.

Figure 8:
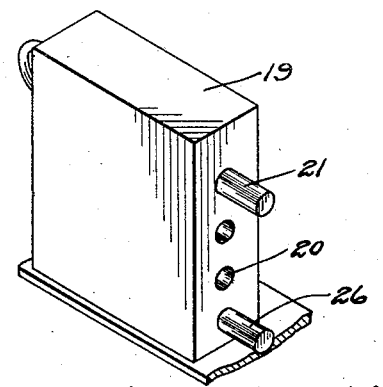
Figure 8 is a detail view of the trigger.

Referring to the drawing in detail, 10 represents a receptacle or hopper for the reception of the feed, the bottom of which is of frusto-conical formation and indicated at 11, thereby providing a restricted opening through which the feed flows. This opening is normally closed by a substantially conical shape false bottom and spreader indicated at 12 and formed with a plurality or series of openings 13 as shown in Figure 1. Rising from this false bottom and spreader is a rod 14 which passes through the receptacle 10, and supported on said rod is a cylindrical member 15 for a purpose to be hereinafter described. Also rising from this cylindrical member are spaced rods 16 and 17 respectively, the former being offset at its upper end as at 18 as clearly shown in Figure 6. The cylindrical portion 15 just mentioned cooperates with a trigger for supporting the false bottom and spreader 12 in a closed position, which trigger is shown in detail in Figure 8.

Figure 3:
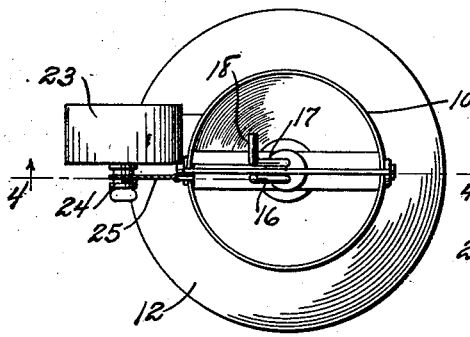
Figure 3 is a top plan view of the feeder.
Figure 4:
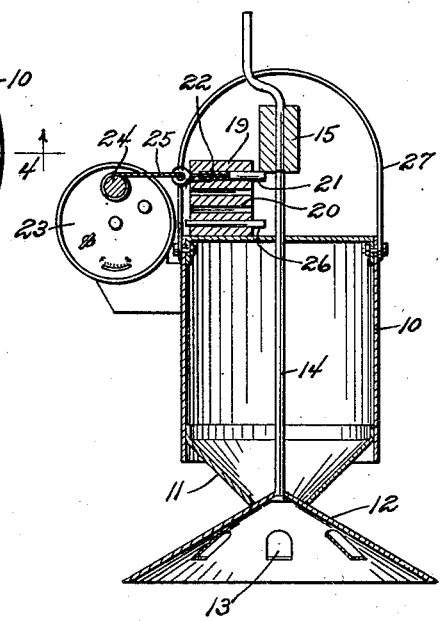
Figure 4 is a sectional view taken on line 4—4 of Figure 3.
Figure 7:
Figure 7 is a detail view of the pulley.
Figure 9:
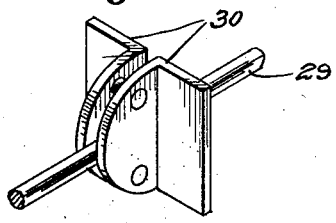
Figure 9 is a detail view of one of the stops for limiting the movement of the feeder.

This trigger consists of a block 19 having a series of spaced superimposed bores 20 arranged transversely of said block, the uppermost bore receiving a spring pressed trigger 21 in the nature of a sliding pin. This pin is normally projected beyond one side of the block by means of the spring 22, in which position it is arranged beneath the cylindrical portion 15 carried by the rod 14, and thus supports the false bottom and spreader 12 in a closed position such as shown in Figure 4. Supported on one side of the receptacle 10 is an alarm clock 23, the shaft 24 of which has connected thereto a flexible element 25, and adapted to be wound about said shaft when the alarm is sounded causing the shaft 24 to rotate. The other end of this flexible element 25 is connected to the pin or trigger 21, so that when the flexible element is wound about the shaft 24 it retracts the trigger or pin 21 within the particular bore of the block 19, thereby releasing the cylindrical member 15, and allowing the false bottom and spreader 12 to gravitate to open position such as shown in Figure 2. Arranged to be positioned in any of the other bores 20 of the block 19 is a stop pin 26 which is always arranged in the path of movement of the cylindrical member 15 carried by the rod 14, so that said cylindrical member will strike the pin 26 and will be thus limited in its movement, to regulate the degree of opening of the false bottom and spreader 12. This manifestly will also regulate the spreading of the feed as it flows from the receptacle 10, the feed striking the false bottom or spreader and being spread thereby in different directions on the ground or the like, some of the feed passing through the openings 13 for this purpose. The receptacle 10 is equipped with a handle or bail 27 which is supported by a block and pulley 28, which is adapted to travel over a wire cable 29. Supported upon this wire line at suitably spaced points are stops such as shown in Figure 9 each stop including a pair of angle shape plates 30 which are bolted or otherwise suitably secured together but arranged at opposite sides of the wire cable 29 as illustrated. These stops limit the movement of the feeder along the wire cable as will be readily understood, and the degree of movement can be thus varied by varying the space or distance between the respective stops. One of the stops is also utilized to hold the feeder in its entirety in a normal inactive position as shown in Figure 1, in which instance it will be noted that the rod 17 rising from the tubular member 15 is positioned behind the adjacent stop.

In accordance with the invention we contemplate the using of a plurality of electric light lamps 31 which are connected in circuit with a switch adapted to be automatically operated to close the circuit when the feeder is called into use. This switch is clearly shown in Figures 1 and 5, wherein it will be noted that 32 constitutes a fixed contact and arranged upon a block 33 of insulated material to cooperate with a contact 34 pivoted on the same block. The contact 34 is normally spaced from the contact 32, and when the feeder is arranged in the position shown in Figure 1, the offset extremity 18 of the rod 17 engages an insulated piece 35 supported on one end of the movable contact 34. Now, when the trigger or pin 21 is actuated to release the false bottom and spreader 13, the rod 14 gravitates through the receptacle 10, and incident to this fall of the rod, the offset extremity 18 of the rod 17 swings the movable contact 34 on its pivot bringing it into engagement with the fixed contact 32, thereby closing the circuit to the electric lamps 31. The lights are thus turned on automatically so that the poultry will leave their roosts and go to feed.

In practice, the clock 23 is set for any particular hour or minute of the day or night which it is desired to feed the poultry, and the cylindrical member 15 carried by the rod which supports the false bottom or spreader 12 is arranged to repose upon the trigger or pin 21. When the parts are arranged in this position the false bottom or spreader 12 is arranged to close the opening in the bottom of the receptacle or hopper 10, which of course retains the feed within the receptacle until the time for feeding the poultry has arrived. When the parts are thus arranged, the feeder is disposed at its starting point on the wire cable 19 with the offset extremity 18 of the rod 17 in engagement with the movable contact 34 above mentioned. When the predetermined time has arrived for the use of the feeder, the shaft 24 of the clock rotates in a direction to wind the flexible element 25 thereon, thus retracting the trigger or pin 21, whereupon the movable bottom and spreader 12 gravitates to an open position. It is during this operation that the feeder is released to travel along the wire cable 29, and just prior to moving along said wire, incident to the fall or drop of the movable bottom 12, the contact 34 is swung into engagement with the contact 32 closing the circuit to the lamps 31. The movement of the feeder along the cable 29 is checked by the other stop shown in Figure 1. During the travel of the feeder along the cable 29, the feed flows from the receptacle 10, striking the spreader 12, and is thus equally distributed along the ground to be consumed.

While it is believed that from the foregoing description, the nature and advantages of the invention will be readily apparent, we desire to have it understood that we do not limit ourselves to what is herein shown and described, and that such changes may be resorted to when desired as fall within the scope of what is claimed.

What we claim is:

An automatically operable poultry feeder comprising a receptacle having an opening in the bottom thereof, a combined movable bottom and spreader normally closing said opening, a rod rising from the movable bottom through the receptacle, a member carried by said rod, time controlled mechanism including a normally projected trigger arranged to engage said member and support the bottom in its closed position, and adapted to be retracted at a predetermined time to allow the bottom to fall to an open position, and adjustable means adapted to be arranged in the path of movement of said member to limit the opening movement of said bottom and thus regulate the flow of feed from the receptacle.

In testimony whereof we affix our signatures.

FRANK H. GERBIG.
WILLIAM C. HENNINGSEN.